(12) United States Patent
Nishimura (10) Patent No.: US 9,360,939 B2
(45) Date of Patent: Jun. 7, 2016

(54) VIDEO-GAME-USE SIMULATED-EXPERIENCE REMOTE CONTROL BUTTON

(71) Applicant: Shinji Nishimura, Yokohama (JP)

(72) Inventor: Shinji Nishimura, Yokohama (JP)

(*) Notice: Subject to any disclaimer, the term of this patent is extended or adjusted under 35 U.S.C. 154(b) by 0 days.

(21) Appl. No.: 14/763,826

(22) PCT Filed: Jul. 10, 2014

(86) PCT No.: PCT/JP2014/068487
§ 371 (c)(1),
(2) Date: Jul. 28, 2015

(87) PCT Pub. No.: WO2015/093084
PCT Pub. Date: Jun. 25, 2015

(65) Prior Publication Data
US 2015/0362996 A1    Dec. 17, 2015

(30) Foreign Application Priority Data
Dec. 17, 2013  (JP) ................................ 2013-259735

(51) Int. Cl.
| | | |
|---|---|---|
| G06F 17/00 | (2006.01) | |
| G06F 3/01 | (2006.01) | |
| A63F 13/245 | (2014.01) | |
| A63F 13/40 | (2014.01) | |
| A63F 13/818 | (2014.01) | |
| A63F 13/285 | (2014.01) | |
| G09B 19/00 | (2006.01) | |
| A63F 13/24 | (2014.01) | |

(52) U.S. Cl.
CPC .............. *G06F 3/016* (2013.01); *A63F 13/24* (2014.09); *A63F 13/245* (2014.09); *A63F 13/285* (2014.09); *A63F 13/40* (2014.09); *A63F 13/818* (2014.09); *G09B 19/003* (2013.01)

(58) Field of Classification Search
USPC ....................................................... 463/28–33
See application file for complete search history.

(56) References Cited

U.S. PATENT DOCUMENTS

| | | | |
|---|---|---|---|
| 9,190,021 B2 * | 11/2015 | Tan ........................ | G06F 3/1454 |
| 2012/0038742 A1 * | 2/2012 | Robinson ............... | H04N 7/142 |
| | | | 348/14.16 |
| 2012/0274727 A1 * | 11/2012 | Robinson ................. | H04N 7/15 |
| | | | 348/14.07 |

OTHER PUBLICATIONS

International Search Report for PCT/JP2014/068487 dated Sep. 22, 2014.
PCT written openion dated Sep. 22, 2014.

* cited by examiner

*Primary Examiner* — Ronald Laneau
(74) *Attorney, Agent, or Firm* — Yokoi & Co., U.S.A.; Toshiyuki Yokoi (57) ABSTRACT

It is a problem of the present invention to provide a technical method to achieve a video-game-use simulated-experience remote control button that allows simulated experience that allows experience and reaction of tactile sense corresponding to video game software. According to the present invention, the button portion of a video-game-use remote control is replaced with a tool and a mechanical device that allow creating tactile sense corresponding to the content of a video game, providing a reaction after a human operator the created tactile sense, operation using the power level of the human, so as to generate a load. The generated load is quantified and the quantified value is set as X, and X is converted into a button operation of the video-game-use remote control so as to achieve a video-game-use simulated-experience remote control button that allows simulated experience of tactile sense.

4 Claims, 6 Drawing Sheets

※ Calculating formula for load is as follows:
   Load = (Power consumption/Predicted power consumption − 1) × 100 = X%

※ Method for converting X into button operation can be freely set corresponding to various computer game software products.

VIDEO-GAME-USE SIMULATED-EXPERIENCE REMOTE CONTROL BUTTON

TECHNICAL FIELD

The present invention is a technical method related to a button of a remote control for a video game to allow a simulated experience that provides an experience of tactile sense corresponding to video game software to allow a reaction.

BACKGROUND ART

As a literature that discloses this type of technique, there is Patent Document 1. The fishing simulator disclosed in Patent Document 1 includes a control board, an operation panel, a fishing rod with a reel, a video disc player device, a winding and feeding mechanism for a fishing line, a lateral swinging mechanism for a fishing line, a tension measuring mechanism for a fishing line, and similar member.

In this fishing simulator, an operator holds a fishing rod in hand and pulls up the fishing rod when a fish is caught while referring to the playback image of a video disc.

The control board determines success and failure of matching based on the timing when a float goes underwater and the timing when the motion of the fishing rod is matched.

In the case where the matching is determined to succeed, the state where the fish acts aggressively is virtually reproduced by the display contents on a screen and the control of the tension of the fishing line. According to this Patent Document 1, the operator can enjoy a hit of fish and feeling of pulling, which are the best part of fishing, in the room.
Patent Document 1: JP-A-7-248723

DISCLOSURE OF THE INVENTION

Problems to be Solved by the Invention

Video game software products include various types and can employ remote controls corresponding to respective video game machines so as to be played by button operations of the remote controls. The term "buttons of remote controls for video games" is a collective term of the buttons used in the remote controls for video games, for example, push buttons, touch buttons, lever buttons, and dial buttons. However, ordinary buttons of the remote controls for video games have not allowed simulated experience of tactile sense.

It is a problem of the present invention to achieve buttons of a remote control for a video game to concentrate techniques only on a button function of the remote control of a video game machine and to allow simulated experience of tactile sense corresponding to the content of a video game.

Corresponding to the content of the video game, virtual tactile sense is created using tools and a mechanical device. The created virtual tactile sense is experienced by a human operator, and a reaction is provided by the power level of the human operator so as to generate a load. The generated load is quantified as a value, and the quantified value is converted into an operation of the button portion of the remote control for the video game to be transmitted to the remote control for the video game as a signal, so as to achieve a video game that allows simulated experience of tactile sense.

It is an object of the present invention to provide a technical method to allow simulated experience of tactile sense corresponding to the content of a video game while playing the video game by replacing the button portion of a remote control for the video game with tools and a mechanical device that allow operation by the power level of the human operator while experiencing tactile sense corresponding to the content of the video game.

Solutions to the Problems

A specific method to solve this problem will be described below using a fishing video game as video game software.

Figure 5:
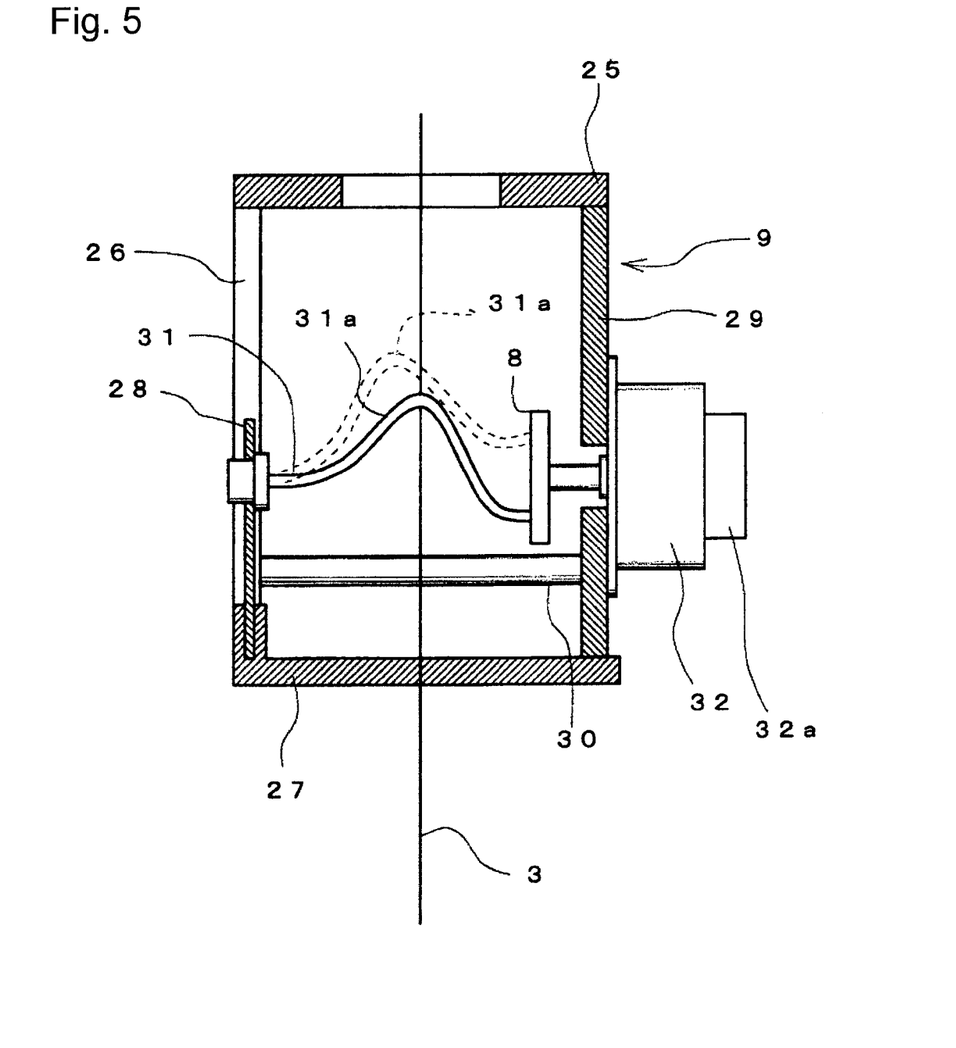
FIG. 5 is a vertical cross-sectional view of a vibration device 9 according to one embodiment of the present invention.
Figure 6:
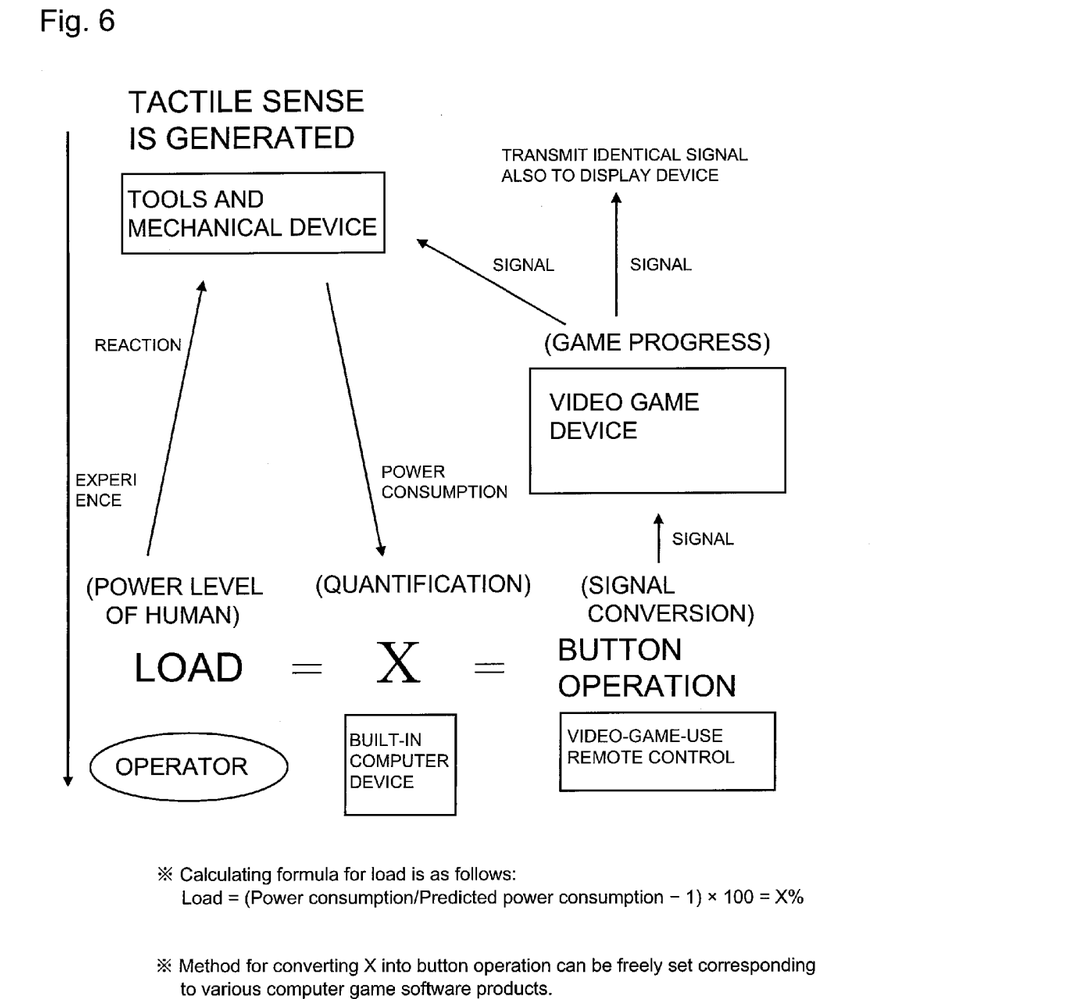
FIG. 6 is a conceptual diagram of the present invention.

The fishing video game is applied to FIG. 6. The tactile sense corresponding to the content of the video game, for example, the pulling force, the moving motion, and vibration due to the motion of the fin of a fish during a hit is created using tools and a mechanical device. The human operator experiences the created tactile sense and operates the tools and the mechanical device by the power level of the human operator, so as to generate a load. This load is quantified as a value, and the quantified value is converted into an operation of the button portion of the remote control for the video game to be transmitted to the remote control for the video game as a signal. In the present invention, a fish-shaped experience machine 4 has a mouth opened upward like FIG. 1. Like FIG. 2 and FIG. 3, the fish-shaped experience machine 4 includes a body 7. The body 7 internally includes: a large movable ring 12 in a true circle shape to rotate along the inner peripheral surface; a first motor 13, which moves the large movable ring 12; a small movable ring 11, which moves inside the large movable ring 12 along an arc passing through the center point of the circle of the large movable ring 12; a second motor 22, which moves the small movable ring 11; a small fixed ring 25 fixed under the center of the circle of the large movable ring 12 like FIG. 2 and FIG. 4; a vibrating body 31, which mounted under the small fixed ring 25, in FIG. 5; a third motor 32, which moves the vibrating body 31; a built-in computer device C, which is mounted in the bottom portion of the fish-shaped experience machine 4 like FIG. 4; a reeling roller 33; a fourth motor 34, which moves the reeling roller 33; and a fishing line 3, which is wound around the reeling roller 33. The fishing line 3 couples to a fishing rod 2.

The built-in computer device C has a feature to perform a first control, a second control, and a third control. The first control receives the signal of a motion of a fish from a video game device 5 to calculate a predicted power consumption. The second control rotates respective motors 13, 22, 32, and 34 corresponding to the signal of the motion of the fish to create tactile sense for the motion of the fish inside the fish-shaped experience machine 4, and transmits the created tactile sense from the fishing line 3 to the fishing rod 2. The third control receives power consumptions of the respective motors 13, 22, 32, and 34 receiving loads due to operations of the fishing rod 2 and the fishing line 3, from respective power meters 13a, 22a, 32a, and 34a, calculates and quantifies the loads from the predicted power consumptions and the power consumptions, and converts the quantified value into a button operation of the remote control for the video game, so as to transmit the button operation to a remote control device R as a signal.

Figure 1:
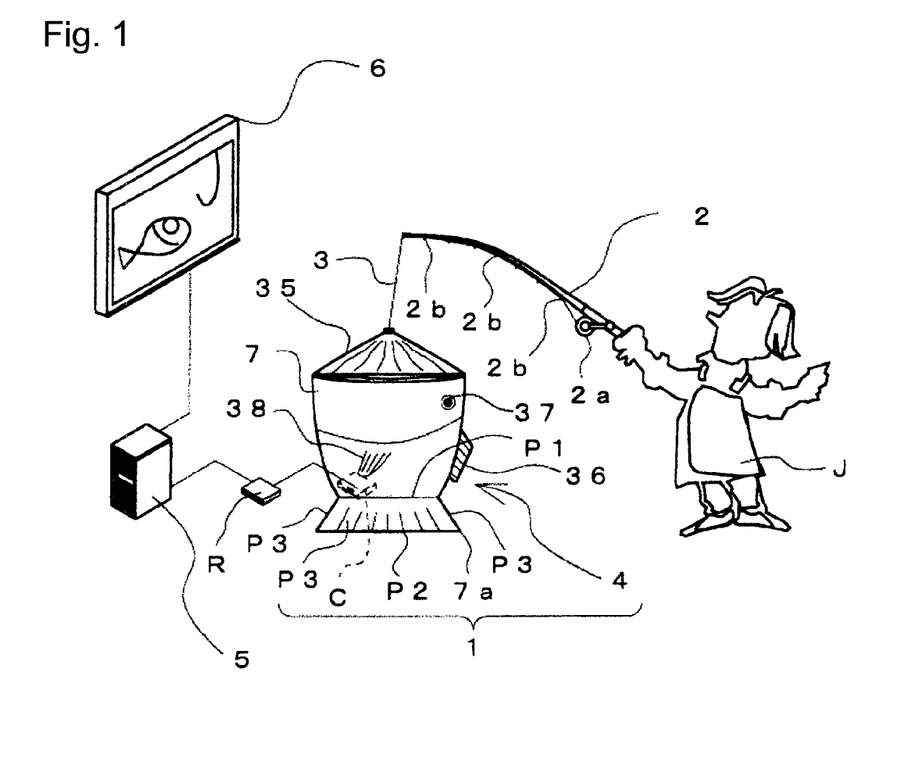
FIG. 1 is a system configuration diagram according to one embodiment of the present invention.

Like FIG. 1, the fishing rod 2 includes a line guide 2b and a reel 2a. The fishing line 3 is wound around the reel 2a while passing through the line guide 2b of the fishing rod 2. The fishing line 3 passes through the reeling roller 33, a fixing rod 30, the vibrating body 31, the small fixed ring 25, and the small movable ring 11, and is extracted to the outside of the fish-shaped experience machine 4. The distal end extracted to the outside of the fish-shaped experience machine 4 is wound around the reel 2a of the fishing rod 2. Then, the built-in computer device C receives the signal of the motion of the fish from the video game device 5 until the end of the video game, to rotate the respective motors 13, 22, 32, and 34 so as to move the respective portions of the large movable ring 12, the small movable ring 11, the vibrating body 31, and the reeling roller 33 in conjunction with one another.

Rotation of the reeling roller 33 in the forward direction pulls the fishing line 3, which is extracted to the outside of the fish-shaped experience machine 4, into the fish-shaped experience machine 4 using the small movable ring 11 as a pull-in point, so as to cause the force pulling the fishing line 3 between the reeling roller 33 and the fishing rod 2 in their opposing directions. Like FIG. 5, movement of the vibrating body 31 in this state transmits vibration from the fishing line 3 to the fishing rod 2.

When the small movable ring 11 moves along the inner peripheral surface of a rack 21 to rotate the large movable ring 12, the pull-in point moves in front to back and side to side directions.

Accordingly, the present invention allows a player J to use the fishing rod 2, the fishing line 3, and the fish-shaped experience machine 4 so as to obtain tactile sense corresponding to the content of the video game. The operations of tools of the fishing rod 2 and the fishing line 3 by the player J causes loads on the respective motors 13, 22, 32, and 34. The built-in computer device C receives power consumptions from the respective power meters 13a, 22a, 32a, and 34a. Then, the built-in computer device C calculates and quantifies the loads from the predicted power consumptions and the power consumptions, and converts the quantified value into an operation of the button portion of the remote control for the video game, so as to transmit the operation to the remote control device R as a signal. The remote control device R transmits a button operation signal to the video game device 5.

BEST MODE FOR CARRYING OUT THE INVENTION

A video game device 5 is premised to transmit a video game's signal, which is transmitted to a display device 6, to the built-in computer device C at the same time.

The following describes embodiments of the present invention with reference to the drawings.

First Embodiment

FIG. 1 is a diagram illustrating the overall configuration of a video-game-use simulated-experience remote control button 1 (hereinafter abbreviated as a fishing-experience remote control button) according to a first embodiment of the present invention.

Like FIG. 6, a signal of a video game from the video game device 5 is transmitted to tools and a mechanical device. Then, based on the signal received by the built-in computer device C provided with the tools and the mechanical device, predicted power consumptions are calculated and the respective motors 13, 22, 32, and 34 are rotated corresponding to the content of the video game, so as to create virtual tactile sense. The human operator experiences the created tactile sense and operates the tools and the mechanical device by the power level of the human operator. The power consumptions of the respective motors 13, 22, 32, and 34, which have received the loads by the operation by the power level of the human, are detected by the respective power meters 13a, 22a, 32a, and 34a and transmitted to the built-in computer device C.

The built-in computer device C calculates and quantifies the loads as a value X from the predicted power consumptions and the power consumptions of the respective motors 13, 22, 32, and 34, and converts the value X into a button operation of a remote control for the video game so as to transmit the signal of the button operation to the remote control device R.

The calculating formula of this load and one converted example into a button operation are shown below.

Load=(Power Consumption/Predicted Power Consumption 1)×100=X%

Press the button for 1 second, 5≥X>0, 0≥X>−5
Press the button for 2 seconds, 10≥X>5, −5≥X>−10
Press the button for 3 seconds, 20≥X>10, −10≥X>−20
Press the button for 4 seconds, 25≥X>20, −20≥X>−25
Press the button for 5 seconds, 30≥X>25, −25≥X>−30
Not press the button, X>30, −30≥X These six kinds of button operations are repeated in a cycle of 5 seconds.

In the button operation of the six kinds of buttons, a binary number is quantified such that a numerical value of 1 is given to an action for pressing a button and a numerical value of 0 is given to an action for not pressing a the button or such that a the numerical value of 0 is given to an the action for pressing a the button and a the numerical value of 1 is given to an the action for not pressing a the button.

X becomes −X % in the case where the fourth motor 34 rotates the reeling roller 33 in the reverse direction.

*Regarding this load, compared to an automobile, an engine and a motor rotate on a downward slope and an upward slope, but the respective energy efficiency are good or poor. The load is calculated by, for example, a method that derives the inclination angle of the slope from good or bad of the energy efficiency.

A fishing-experience remote control button allows the player J to experience tactile sense in the simulated experience of fishing, and can provide the reaction of the player J in response to the experience of the tactile sense. Like FIG. 1, the fishing-experience remote control button is constituted of a fish-shaped experience machine 4, the fishing line 3, and the fishing rod 2. The built-in computer device C couples to the remote control device R and the video game device 5, and the video game device 5 couples to the display device 6.

The fish-shaped experience machine 4 has the appearance of a fish.

The fish-shaped experience machine 4 includes a base portion 7a. The base portion 7a has a shape where the top side of a quadrangular pyramid is cut off. Then, in the base portion 7a, a top surface P1 and an inferior surface P2 face each other in parallel lines at a distance. There is a side surface P3 between the top surface P1 and the inferior surface P2. The top surface P1 has a quadrangular shape having 40 cm in longitudinal width and 40 cm in lateral width. The inferior surface P2 has a quadrangular shape having 50 cm in longitudinal width and 50 cm in lateral width. The side surface P3 has a trapezoidal shape.

The body 7 is fixed to the top surface P1 of the base portion 7a. The body 7 has a cylindrical shape, which is a shape whose mouth is opened upward and a shape whose lower portion is gradually narrowed. The opening portion has a diameter of 50 cm, and the body 7 has a height of 45 cm.

Like FIG. 1, approximately in the center on the outer peripheral surface of the fish-shaped experience machine 4, a back fin portion 36, which is a simulated back fin of the fish, is disposed. In the positions apart from the back fin portion 36 toward both sides by the identical distance, a pair of fish-eye portions 37, which are simulated eyes of the fish, is disposed. In the positions apart from both the fish-eye portions 37 by the identical distance toward the opposite side of the back fin portion 36, a pair of fin portions 38, which are simulated abdominal fins of the fish, is disposed.

Here, FIG. 1 illustrates one of the fish-eye portions 37 and one of the fin portions 38 alone.

Figure 2:
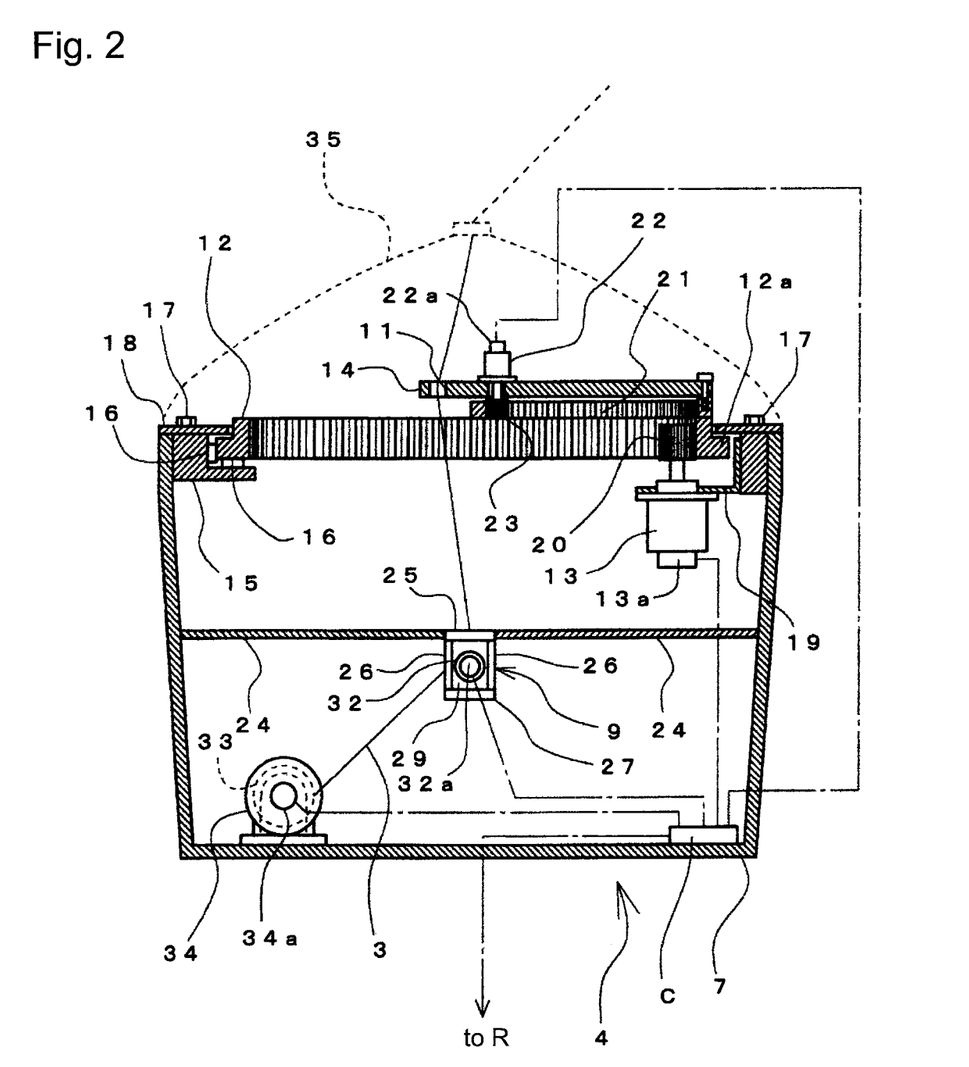
FIG. 2 is a vertical cross-sectional view of a fish-shaped experience machine 4 according to the one embodiment of the present invention.
Figure 3:
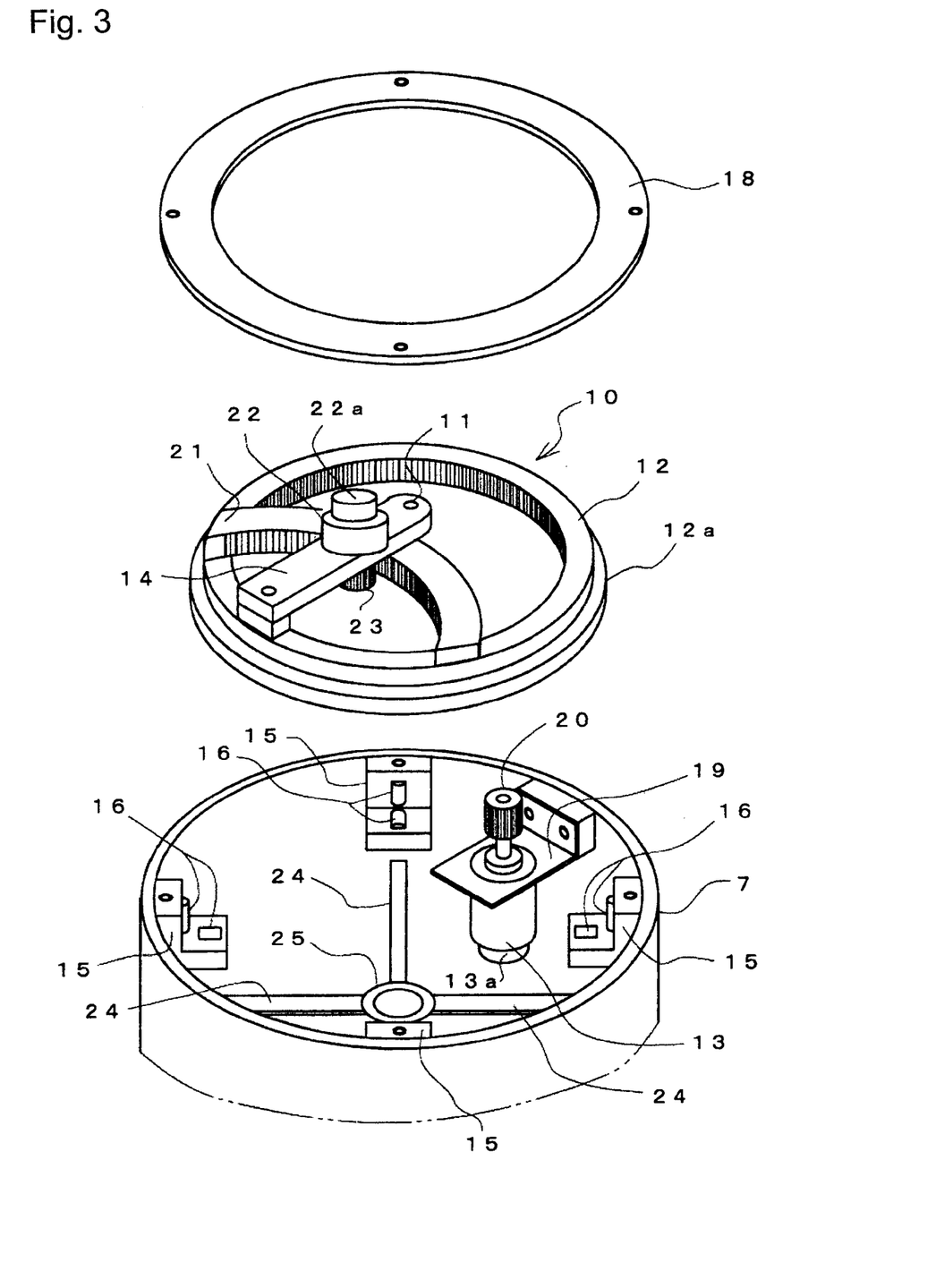
FIG. 3 is an exploded perspective view of a ring portion 10 according to the one embodiment of the present invention.

Like FIG. 2 and FIG. 3, the inside of the fish-shaped experience machine 4 is divided into: an upper layer portion where the ring portion 10 is installed; an intermediate layer portion where the vibration device 9 is installed; and a lower layer portion where the built-in computer device C and the reeling roller 33 are installed.

Like FIG. 3, the upper layer portion of the fish-shaped experience machine 4 includes the large movable ring 12 in a true circle shape; the first motor 13, which rotates the large movable ring 12; the small movable ring 11, which passes through the center point of the circle of the large movable ring 12 along an arc shape; the second motor 22, which moves the small movable ring 11; a moving arm 14 integrated with the small movable ring 11; and the rack 21 in an arc shape having the supporting point of the moving arm 14 in the center.

The large movable ring 12 has: an inner peripheral surface where teeth are formed over the whole circumference; and an outer peripheral surface where a flange 12a is formed. The inferior surface and the side surface of the flange 12a are supported by a plurality of supporting members 15, which are mounted at intervals on the inner peripheral surface of the body 7.

Figure 4:
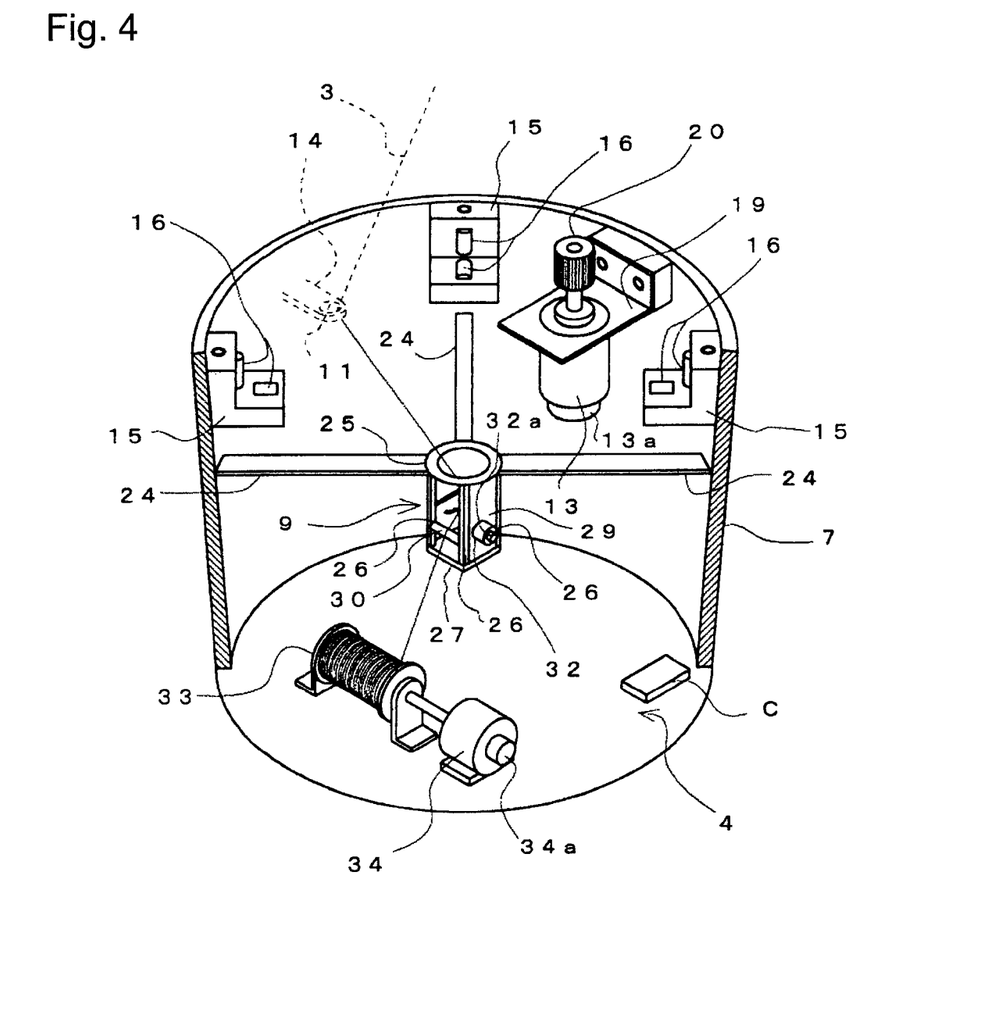
FIG. 4 is a partially cutaway perspective view illustrating the inside of the fish-shaped experience machine 4 according to the one embodiment of the present invention.

Like FIG. 2, FIG. 3, and FIG. 4, on each supporting member 15, a supporting roller 16 in contact with the inferior surface and the side surface of the flange 12a is mounted. The supporting roller 16 supports the large movable ring 12 in a predetermined position in the fish-shaped experience machine 4 to allow free rotation.

A retaining ring 18 is put on the top surface of the flange 12a and fixed with bolts 17. The retaining ring 18 avoids dropping off of the large movable ring 12 from the fish-shaped experience machine 4.

The first motor 13 is mounted on a bracket 19 on the inner surface of the body 7, and has a rotation axis having a distal end portion on which a pinion 20 engaging with the teeth on the inner peripheral surface of the large movable ring 12 is mounted.

The power meter 13a for detecting power consumption is mounted on the first motor 13.

The power meter 13a electrically couples to the built-in computer device C using a signal line, and transmits the power consumption to the built-in computer device C.

The moving arm 14 and the rack 21 are mounted on the large movable ring 12. The rack 21 has an arc shape having the supporting point of the moving arm 14 in the center, and has an inner peripheral surface where teeth are formed.

The moving arm 14 includes the second motor 22, which moves the moving arm 14 along the inner peripheral surface of the rack 21.

The second motor 22 is mounted on the top surface of the moving arm 14. Its rotation axis passes through the moving arm 14, and a pinion 23 engaging with the teeth of the rack 21 is mounted on the distal end of this rotation axis.

The power meter 22a for detecting power consumption is mounted on the second motor 22.

The power meter 22a electrically couples to the built-in computer device C using a signal line, and transmits the power consumption to the built-in computer device C.

Like FIG. 2, FIG. 4, and FIG. 5, on the intermediate layer portion of the fish-shaped experience machine 4, the small fixed ring 25, which is supported by a plurality of stays 24, is mounted under the upper layer portion. Under this small fixed ring 25, the vibration device 9 is mounted.

The vibration device 9 is constituted of: a plurality of support rods 26 integrated with the inferior surface of the small fixed ring 25; a lower plate 27 mounted under these support rods 26; and side portion plates 28 and 29 mounted between these support rods 26 to face each other.

Inside the vibration device 9, a fixing rod 30 is mounted between the opened support rods 26 without the side portion plates 28 and 29. Between the side portion plates 28 and 29, the vibrating body 31 is mounted on a disc plate 8 in a rotatable state approximately parallel to the fixing rod 30. This disc plate 8 couples to the third motor 32. The internal configuration includes the fixing rod 30, the vibrating body 31, the disc plate 8, and the third motor 32.

The vibrating body 31 has a shape whose intermediate portion is curved upward as a curved portion 31a. The fishing line 3 passing through the inside of the small fixed ring 25 from above to below passes through the upper side of the fixing rod 30 from the lower side of the curved portion 31a and couples to the reeling roller 33.

On the distal end of the rotation axis of the third motor 32, the disc plate 8 is mounted. In the position apart from the rotational center of this disc plate 8, the vibrating body 31 is coupled in a rotatable state. The power meter 32a for detecting power consumption is mounted on the third motor 32.

The power meter 32a electrically couples to the built-in computer device C using a signal line, and transmits the power consumption to the built-in computer device C.

The vibrating body 31 is bonded to the side portion plate 28. When the third motor 32 rotates the disc plate 8, the vibrating body 31 integrally rotates while having the portion fixed to the side portion plate 28 as a supporting point.

In the state where the fishing line 3 has a tension, when the integral rotation of the vibrating body 31 cause movement of the curved portion 31a in the above-below direction, vibration is given to the fishing line 3.

Like FIG. 2 and FIG. 4, in the lower layer portion of the fish-shaped experience machine 4, the built-in computer device C, the reeling roller 33, and the fourth motor 34 are fixed to the bottom portion of the fish-shaped experience machine 4.

The power meter 34a for detecting power consumption is mounted on the fourth motor 34.

The power meter 34a electrically couples to the built-in computer device C using a signal line, and transmits the power consumption to the built-in computer device C.

The fishing line 3 is wound around the reeling roller 33. The fishing line 3 passes through the upper side of the fixing rod 30 from the reeling roller 33, passes through the lower side of the curved portion 31a of the vibrating body 31, passes through the inside of the small fixed ring 25 from below to above, and passes through the inside of the small movable ring 11 from below to above, to be coupled to the fishing rod 2.

Like FIG. 1, the fishing rod 2 includes the line guide 2b and the reel 2a. The fishing line 3 is wound around the reel 2a while passing through the line guide 2b of the fishing rod 2. The rotation of the reel 2a in the forward direction causes reeling of the fishing line 3, and the rotation of the reel 2a in the reverse direction causes feeding of the fishing line 3.

The display device 6 is a device that outputs images and audio, and outputs images and audio based on the signal transmitted from the video game device 5.

The video game device 5 transmits the signal of the motion of the fish to the built-in computer device C and the display device 6 at the same time. The video game device 5 couples to the remote control device R, the built-in computer device C, and the display device 6, using signal lines.

The built-in computer device C performs motor control and calculates the load on the motor.

The motor control is a control that rotates the respective motors 13, 22, 32, and 34 while predicting power consumptions so as to create tactile sense of the motion of the fish corresponding to the content of the video game inside the fish-shaped experience machine 4.

Like FIG. 6, the calculation of the load on the motor is a calculation that receives power consumptions from the respective power meters 13a, 22a, 32a, and 34a to quantify the load from the predicted power consumptions and the power consumptions. The quantified load is converted into a button operation of the remote control for the video game and then is transmitted to the remote control device R as a signal.

The following describes the operation according to this embodiment. In this embodiment, like FIG. 1, the player J places the fish-shaped experience machine 4 in front of the display device 6, stands at the side surface of the fish-shaped experience machine 4, and holds the end portion of the fishing rod 2, to play the fishing video game.

The player J operates the fishing rod 2, the reel 2a, and the fishing line 3 while watching the motion of the fish on the display screen of the display device 6.

When receiving the signal of the motion of the fish from the video game device 5, the built-in computer device C rotates the respective motors 13, 22, 32, and 34 to create virtual motions of the fish, for example, the pulling force, the moving force, and the vibration due to movement of the fin of the fish inside the fish-shaped experience machine 4.

In this process, the built-in computer device C rotates the reeling roller 33 in the forward direction or the reverse direction, so as to rotate the disc plate 8 in the forward direction.

When the reeling roller 33 rotates in the forward direction, the fishing line 3 is pulled in the fish-shaped experience machine 4 while having the small movable ring 11 as the pull-in point. Then, a tension occurs in the fishing line 3 between the reeling roller 33 and the fishing rod 2.

In this state, rotation of the disc plate 8 causes motion of the curved portion 31a, on which the fishing line 3 of the vibrating body 31 is wound, in the above-below direction such that frequent changes occur in the tension of the fishing line 3 and transmit to the fishing rod 2 as vibration.

Furthermore, the rotations of the first motor 13 and the second motor 22 at the same time combine the movement of the small movable ring 11 with the rotational movement of the large movable ring 12. This allows moving the pull-in point in various directions in the whole area within the circle of the large movable ring 12.

Accordingly, the player J can use the fishing rod 2 and the fishing line 3 to experience tactile sense corresponding to the content of the video game.

In response to the experienced tactile sense, the player J operates tools of the fishing rod 2 and the fishing line 3 such that the respective motors 13, 22, 32, and 34 receive loads. The built-in computer device C receives power consumptions from the respective power meters 13a, 22a, 32a, and 34a. Then, the built-in computer device C calculates and quantifies the loads from the predicted power consumptions and the power consumptions, and converts the quantified value into an operation of the button portion of the remote control for the video game, so as to transmit the operation to the remote control device R as a signal.

The video-game-use simulated-experience remote control button is obtained by replacing a button portion of a remote control for a video game without allowing virtual experience of tactile sense corresponding to the content of the video game with tools and a mechanical device that allow: creating tactile sense corresponding to the content of a video game; an operator to experience the created tactile sense; and providing a reaction in response to the experienced tactile sense. The operator operates the tools and the mechanical device by the power level of the human while experiencing the tactile sense corresponding to the content of the video game. Like FIG. 6, this allows providing loads on the tools and the mechanical devices.

Then, the generated load is quantified as a value X. When the value X is converted into a button operation of the remote control for the video game, the following relationship is constantly satisfied.

$$\text{Load}=X=\text{Button Operation}$$

This formula achieves a video-game-use simulated-experience remote control button that allows operation by the power level of the operator.

In this embodiment, the opening portion of the fish-shaped experience machine 4 is covered with a safety cover 35 as a movable material having a hole that allows passage of the fishing line 3 so as to prevent injury during contact with the fish-shaped experience machine 4 inside the machine.

Second Embodiment

The following describes a second embodiment of the present invention.

In the first embodiment, the built-in computer device C rotates the motor using the signal from the video game device 5.

However, in the case where only a signal of the water surface is obtained from the video game device 5 and the motion of the fish under the water surface is unclear, in this embodiment, a random number is used to determine which direction in front, back, right, left, above, and below directions the fish moves. The motor is rotated corresponding to the determined direction of the movement of the fish.

Specifically, in this embodiment, the built-in computer device C determines the position of the fish after movement based on a random number. Subsequently, the built-in computer device C calculates the moving direction and the angle of the moving arm 14 and the rotation direction and the angle of the large movable ring 12, which are required to move to this position, and rotates the second motor 22 and the first motor 13 to move the moving arm 14 so as to rotate the large movable ring 12.

In addition, the rotation direction of the fourth motor 34 is determined to rotate the reeling roller 33.

The third motor 32 is rotated in the forward direction so as to move the vibrating body 31.

Like FIG. 6, a calculating formula for load and a method for converting a quantified load into a remote control button operation to transmit an operation signal to the remote control device R are similar to those in the first embodiment.

This embodiment can also provide an advantageous effect similar to that of the first embodiment.

While the first and second embodiments of the present invention have been described above, the following modifications may be applied to these embodiments.

The shape of the fish-shaped experience machine 4 has the appearance of the simulated fish. However, this shape may be another shape.

The respective mechanical devices of the display device 6, the video game device 5, the remote control device R, and the fish-shaped experience machine 4 need not be independently separated from one another, but may be integrally provided with one another. The signal lines coupling all the mechanical devices may be any of a wired line and a wireless line.

Here, the present invention may employ the following ideas.

Not only the fishing-simulated-experience video game using fishing tools, but also various types of simulated-experience video games using other tools and mechanical device can be achieved.

The following describes the examples.

In the case where a strength training machine is applied to FIG. 6 to play a fighting video game, premised on perfect consideration on safety countermeasures, a simulated-experience video game that allows performing strength training while playing the video game can be achieved by experience of tactile sense as a rebound felt to be appropriate and a process of: operating the strength training machine by putting some muscle; quantifying the operating load; and converting the quantified value into an operation of the button portion of a remote control for the video game.

Alternatively, FIG. 6 is applied to a rehabilitation machine used in a hospital. It is necessary to create new video game software. However, a simulated-experience video game that allows performing rehabilitation training while playing the video game can be achieved by converting an operation of the rehabilitation machine into an operation signal of the button portion of a remote control for the video game. For people working on rehabilitation therapy, weakened nerves can experience moderate tactile sense. This reduces the mental burden due to repetition of boring training. The applications to new usages for these video games are possible.

DESCRIPTION OF REFERENCE SIGNS

1: Video-game-use simulated-experience remote control button
2: Fishing rod
2*a*: Reel
2*b*: Line guide
3: Fishing line
4: Fish-shaped experience machine
5: Video game device
6: Display device
7: Body
7*a*: Base portion
8: Disc plate
9: Vibration device
10: Ring portion
11: Small movable ring
12: Large movable ring
12*a*: Flange
13: First motor
13*a*: Power meter
14: Moving arm
15: Supporting member
16: Supporting roller
17: Bolt
18: Retaining ring
19: Bracket
20: Pinion
21: Rack
22: Second motor
22*a*: Power meter
23: Pinion
24: Stay
25: Small fixed ring
26: Support rod
27: Lower plate
28: Side portion plate
29: Side portion plate
30: Fixing rod
31: Vibrating body
31*a*: Curved portion
32: Third motor
32*a*: Power meter
33: Reeling roller
34: Fourth motor
34*a*: Power meter
35: Safety cover
36: Back fin portion
37: Fish-eye portion
38: Fin portion
C: Built-in computer device
J: Player
R: Remote control device
P1: Top surface
P2: Inferior surface
P3: Side surface

What is claimed is:

1. A video-game-use simulated-experience remote control button for replacing a button portion of a video-game-use remote control with a tool and a mechanical device to allow simulated experience of tactile sense corresponding to a content of a video game by: creating virtual tactile sense corresponding to the content of the video game using the tool and the mechanical device like a fishing rod, a fishing line, and a fish-shaped experience machine; generating a load by providing a reaction using a power level of a human operator after the human operator experiences the created virtual tactile sense; quantifying the generated load as a value; and converting the quantified value into an operation of the button portion of the video-game-use remote control; and transmitting the operation to the video-game-use remote control as a signal, wherein the fish-shaped experience machine includes: a body whose opening portion is covered with a safety cover; a large movable ring in a true circle shape, the large movable ring being configured to rotate along an inner peripheral surface of the body; a first motor configured to move the large movable ring; a small movable ring configured to move within the large movable ring along an arc passing through a center point of the circle of the large movable ring; a second motor configured to move the small movable ring; a small fixed ring fixed under a center of the circle of the large movable ring; a vibrating body mounted under the small fixed ring; a third motor configured to move the vibrating body; a fixing rod fixed near the vibrating body; a built-in computer device fixed to a bottom portion of the body; a reeling roller; and a fourth motor configured to move the reeling roller 33, the fishing line wound around the reeling roller is extracted to an outside of the fish-shaped experience machine while passing through the fixing rod, the vibrating body, the small fixed ring, and the small movable ring to be mounted on the fishing rod, and the built-in computer device is configured to control rotations of the respective motors with power meters based on the signal of the video game received from the video game device or a random number so as to create the virtual tactile sense corresponding to the content of the video game as a technical configuration, and the built-in computer device provided with the tool and the mechanical device is configured to execute a first control, a second control, and a third control to replace the button portion of the video-game-use remote control with the tool and the mechanical device to allow simulated experience of the tactile sense corresponding to the content of the video game, the first control calculating a predicted power consumption of a motor when the motor is driven based on the received signal of the video game or the random number, the second control driving the motor based on the received signal of the video game or the random number to create the virtual tactile sense corresponding to the content of the video game, the third control receiving a power consumption from a power meter of the motor having received the load by providing the reaction using the power level of the human operator after the human operator experiences the created virtual tactile sense; quantifying the generated load as a value X; converting the value X into the operation of the button portion of the video-game-use remote control; and transmitting the value X to the video-game-use remote control as the signal.

2. The video-game-use simulated-experience remote control button according to claim 1, wherein the button portion of the video-game-use remote control is replaced by the tool and the mechanical device that allow simulated experience of the tactile sense corresponding to the content of the video game.

3. The video-game-use simulated-experience remote control button according to claim 1, wherein when the tool and the mechanical device that allow creating the tactile sense corresponding to the content of the video game and providing the reaction after the operator experiences the created tactile sense are operated using the power level of the human operator so as to cause the load in the tool and the mechanical device, quantify the generated load as the value X, and convert the value X into a button operation of the video-game-use remote control, a relationship shown as a formula below is constantly satisfied:

$$\text{Load} = X = \text{Button Operation}.$$

4. The video-game-use simulated-experience remote control button according to claim 1, wherein the tool and the mechanical device that allow creating the tactile sense corresponding to the content of the video game and providing the reaction after the human operator experiences the created tactile sense are operated using the power level of the human operator so as to cause the load in the tool and the mechanical device, quantify the generated load as a value X, convert the value X into a button operation of the video-game-use remote control, and quantify the button operation as a binary number such that a numerical value of 1 is given to an action for pressing a button and a numerical value of 0 is given to an action for not pressing the button or such that the numerical value of 0 is given to the action for pressing the button and the numerical value of 1 is given to the action for not pressing the button.

* * * * *